United States Patent [19]
Persson

[11] 4,393,609
[45] Jul. 19, 1983

[54] FEEDING DEVICE

[76] Inventor: Arne Persson, Pl 5165, S-82027 Söderala, Sweden

[21] Appl. No.: 328,571
[22] PCT Filed: Mar. 28, 1980
[86] PCT No.: PCT/SE81/00102
  § 371 Date: Nov. 24, 1981
  § 102(e) Date: Nov. 24, 1981
[87] PCT Pub. No.: WO81/02723
  PCT Pub. Date: Oct. 1, 1981
[51] Int. Cl.³ .............................................. E01H 5/09
[52] U.S. Cl. ...................................... 37/238; 198/671; 198/676
[58] Field of Search .................. 37/43 R, 43 E, 43 D, 37/238, 242, 260; 198/658, 671, 676

[56] References Cited

U.S. PATENT DOCUMENTS

| 553,403 | 1/1896 | Gulbransen | 198/658 |
| 1,401,155 | 12/1921 | Jacoby | 198/658 |
| 2,038,904 | 4/1936 | Rand | 198/671 X |
| 3,696,535 | 10/1972 | Kallio | 37/43 R |
| 4,146,145 | 3/1979 | Easton | 198/676 X |
| 4,222,502 | 9/1980 | Gubitose et al. | 198/658 |

FOREIGN PATENT DOCUMENTS 1019848 11/1957 Fed. Rep. of Germany ...... 198/676

Primary Examiner—E. H. Eickholt
Attorney, Agent, or Firm—Zarley, McKee, Thomte, Voorhees & Sease

[57] ABSTRACT

A feeding device comprises a rotary drum (1) in the casing wall (2) of which narrow slots (3, 4) are provided, said slots serving as intakes for the material to be fed. Blade-like elements (5, 6) project from the outside of the casing wall and co-operate with said slots for the purpose of ripping and carrying along material upon rotating of the drum so as to introduce the material into the interior of the drum through the intake slots (3, 4). On the inside of the casing wall (2) flange members (9, 10) are provided for conveying the material introduced into the drum to an outlet opening (8) at one end of the drum. (FIG. 1).

7 Claims, 6 Drawing Figures

FEEDING DEVICE

TECHNICAL FIELD AND BACKGROUND OF THE INVENTION

By the Swiss patent specification No. 575,515 a feeding device is previously known which comprises a rotary drum in the casing wall of which one or more openings are provided to serve as intakes with which blade-like elements cooperate, said blade elements projecting outwardly from the outside of the casing wall so as to rip and carry along goods and bring it into the interior of the drum through said intake upon rotation of the drum, means being provided inside the casing wall for conveying the goods introduced into the drum to an outlet opening at an end of the drum. This feeding device is made in the form of a snow-blowing machine by means of which snow can be picked up from the ground and fed to a conventional ejector tube which in turn blows out the snow in the desired direction.

In the above-mentioned structure the intake openings consist of holes arranged in several, more precisely two rings which are spaced apart along the longitudinal axis of the drum, though located close to each other, said rings each including a plurality of individual holes which are radially displaced relative to each other in the various rings in such a way that interspaces occur between the holes in adjacent rings. This means that the snow material will be introduced intermittently into the interior of the drum and bring about a comparatively irregular feeding of the material through and out of the device in question. Besides the holes are approximately square-shaped having a rather great area in comparison with the total area of the drum; a fact that entails the risk that stones or similar big and hard objects get into the interior of the drum and thereafter inflict damage on the drum as well as parts connected thereto.

SUMMARY OF THE INVENTION

The object of the present invention is to eliminate the drawbacks of the previously known feeding devices of the above-mentioned type and provide a feeding device which works with an extremely regular and effective feeding of the material in question. According to the invention this is achieved by a device which is characterized in that the intake opening is in the form of a narrow slot which together with the adherent blade element extends helically along the casing wall and that the means for conveying the material to the outlet opening consists of a flange which projects from the inside of the casing wall towards the interior of the drum and which flange like the slot and the blade element extends helically in the direction from one of the ends of the drum towards the other. According to a preferred embodiment of the invention the helix of said interior flange is opposite to the helix of the exterior blade element. Though the feeding device of the invention per se is possible to use in snowblowing machines it may in practice, with particular advantage be used for feeding such bulk materials as grain, chemicals and the like.

BRIEF DESCRIPTION OF THE DRAWINGS

With reference to the appended drawings a closer description of the invention will follow hereinafter.

In the drawings.

BEST MODE OF CARRYING OUT THE INVENTION

Figure 1:
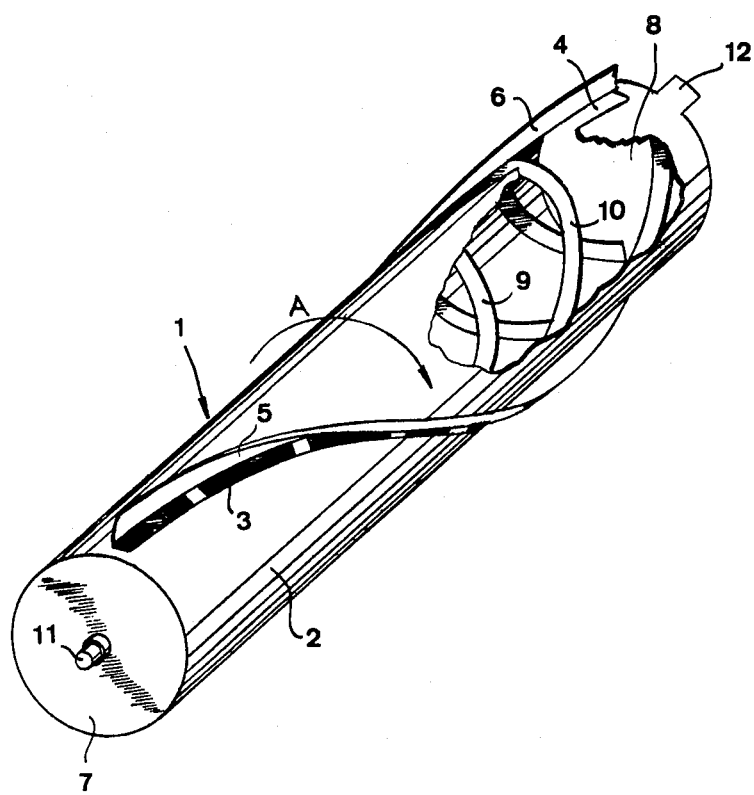
FIG. 1 is a perspective view of the feeding device of the invention in the general design thereof, parts of the device having been broken away for the sake of clarity.
Figure 2:
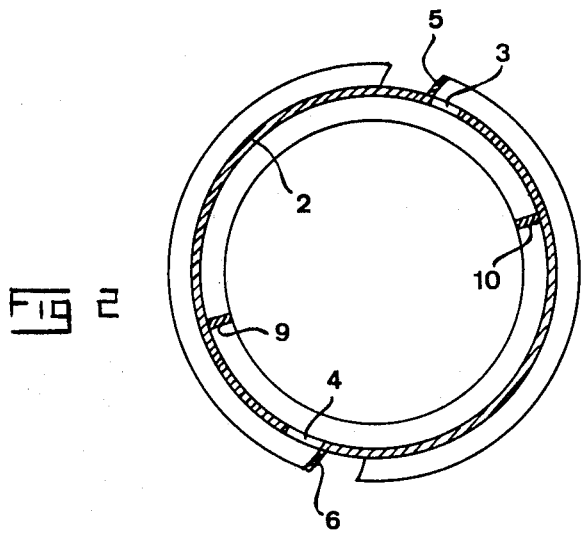
FIG. 2 is an enlarged cross section through the device shown in FIG. 1.

The feeding device shown in its isolated state in FIGS. 1 and 2 is made of a drum generally designated 1 which is rotatable in any arbitrary manner. In the casing wall 2 of this drum two slots 3, 4 are present in order to serve as intakes, said slots extending helically between the two opposite ends of the drum. With these opening slots blade-like elements in the form of strips 5 and 6 respectively cooperate, said elements likewise extending helically along the casing wall with substantially the same pitch as the adherent slot. More precisely these strips 5, 6 are located at the rear edge of the adherent slot if it is assumed that the drum rotates in the direction of the arrow A.

In the example shown the drum 1 is closed at one of its ends by means of the gable wall 7 and at the opposite end thereof it has an outlet opening 8 through which the material introduced into the interior of the drum by the strips 5, 6 is fed out. In order to perform this feeding movement of the material at least one and in this case two flanges 9, 10 are attached to the inside of the casing wall 2, said flanges projecting from the inside of the casing wall towards the interior of the drum and—like the strips 5, 6—extend helically in the direction from one of the ends of the drum towards the other. As clearly appears from FIG. 1 the helix of the interior flanges 9, 10 is however opposite to the helix of the two exterior strip elements 5, 6. Further it should be noted that the pitch or helix angle of the exterior strip elements 5, 6 as well as the slots is greater than the pitch of the interior flanges.

The strip elements 5, 6 extend continuously from one end of the drum to the other. The same thing applies to the slots 3, 4 with the exception of the small interruptions which are formed by the interior flanges 9, 10. The width of the strip elements 5, 6 must not substantially exceed the width of the slot in question. In practice the width of the strip elements may coincide with the width of the slot, whereby the strip element may be produced of precisely those material portions which are taken out or broken away from the casing wall of the drum in order to form the slots in question. In practice the width of the slots may amount to 5 to 15, preferably about 10% of the diameter of the drum.

In FIG. 1 a stub axle 11 is illustrated on the gable wall 7. By means of this stub axle the adherent end of the drum may be mounted in bearings in any arbitrary manner. At the opposite end of the drum there are three wall portions 12 (of which one only is visible in the drawing) projecting in the length direction of the drum. These wall portions 12 may be used for driving the drum as well as mounting the same in bearings in spite of the existance of the outlet opening 8.

In the embodiment shown in FIGS. 1 and 2 each individual strip and slot respectively runs helically approximately half a revolution as seen from one end of the drum to the opposite end thereof. By the fact that the number of strips and slots respectively is two it is however guaranteed that some portion of a strip always is in contact even with a thin string of material extending parallel to the axis of the drum, and thereby the infeed of the material and accordingly the outfeed through the outlet opening will become regular under all circumstances. Of course it is possible to let each individual strip and the adherent slot run helically more than half a revolution around the drum, possibly with a smaller pitch than the one shown in the drawing. If the number of helix revolutions is greater than one it is furthermore possible to use only one strip and slot instead of two as is the case in the embodiment illustrated. In this connection it should be noted that the strips 5, 6 advantageously may have a somewhat arcuate shape in cross section as best illustrated in FIG. 2.

Instead of two interior transportation or conveying flanges 9, 10 it is possible to use one such flange only. Two flanges having a comparatively small pitch have however proved to be advantageous inasmuch as the number of rigifying bridges over the slots will be comparatively great and this fact in turn implies an advantageous rigidity of the structure in its entirety.

If one looks at the drum 1 from the end at which the outlet opening 8 is located and assumes that the drum rotates in the direction of the arrow A one will find that the two strips 5, 6 run in a direction which is opposite to the direction of rotation of the drum. This results in the advantageous effect that possibly existing objects of great sizes, such as e.g. stones upon contact with the strips are given a tendency to move in the direction away from the outlet end of the drum where delicate bearing and driving means may be placed. This effect will of course be most significant if the drum is freely overhanging from the closed end thereof (as the case may be in snow-blowing machines).

Figure 3:
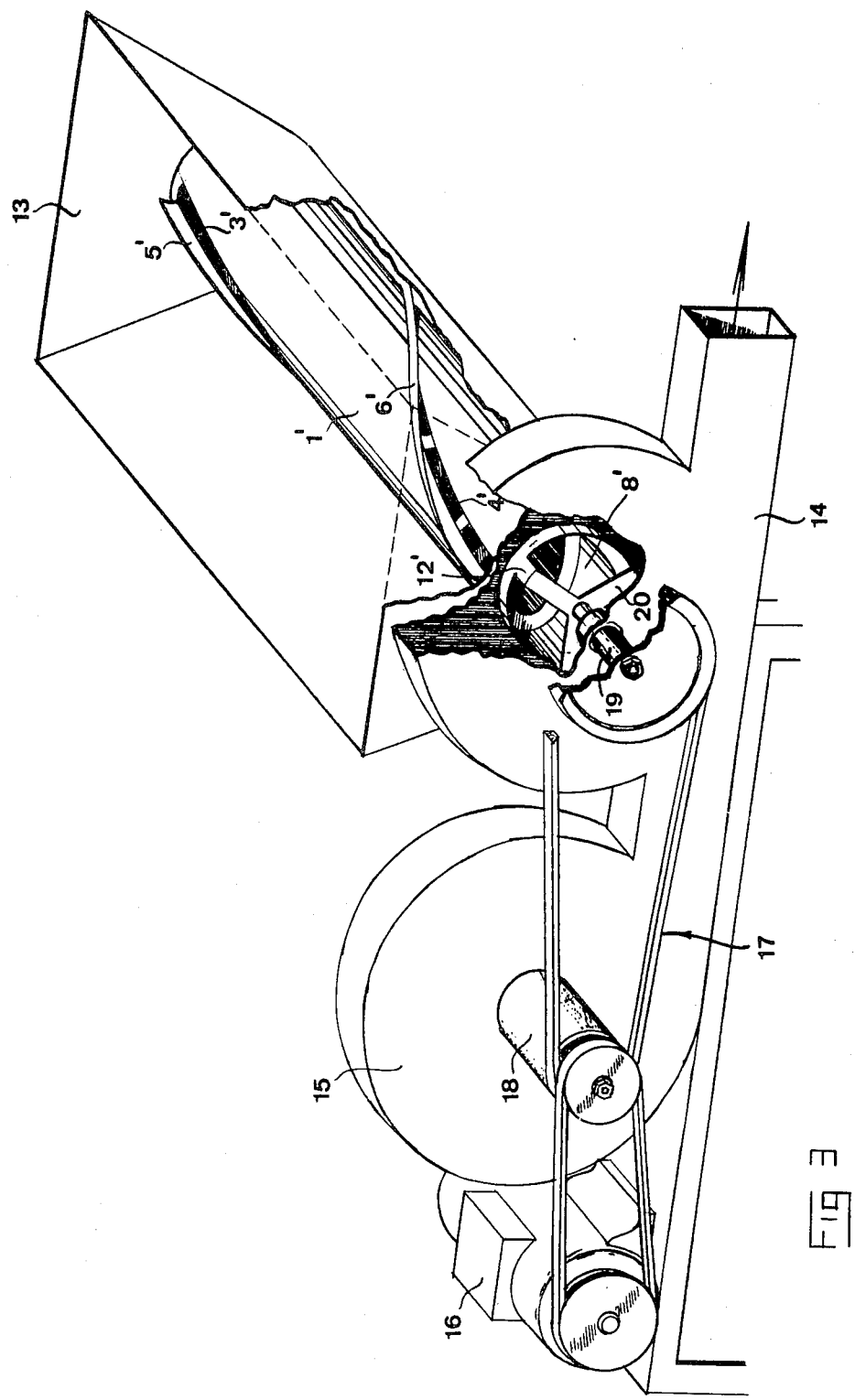
FIG. 3 is a perspective view illustrating a prototype of a drying apparatus in which the device of the invention is included, parts of said apparatus having been broken away, and FIGS. 4 to 6 simple sketches illustrating three different practical fields of application of the feeding device in question.

Now, reference is made to FIG. 3 which illustrates a prototype of a drying apparatus in which a feeding drum 1' of the invention is included. The apparatus in its entirety comprises a container 13 for receiving bulk load or grain-like material, the drum 1' being mounted in the bottom portion thereof. At the outlet 8' the drum 1' opens into a conveying duct generally designated 14 in which an air stream is provided that conveys the material fed out of the drum to the location intended. This airstream is achieved by means of a fan 15 which is connected to a driving means in the form of an electric motor 16 which, through a transmission generally designated 17, drives not only the fan 15 but also the drum 1', the transmission ratio between the fan wheel and the drum being such that the fan is driven at a considerably higher speed than the drum. Though the transmission 17 in the drawing is illustrated as simple V-belts and grooved pulleys respectively, which transmit the rotation of the motor 16 to the drive shafts 18 and 19 respectively, the transmission may in practice include more components, such as gear wheels connected to the shaft 19 for substantially reducing the speed thereof. As clearly appears from FIG. 3 the drive shaft 19 is connected to the drum through a three-armed cross-member 20 which is attached to the three projecting casing wall portions 12'.

The air conveyed through the conveying duct 14 may eventually be pre-heated by heating the inlet air to the fan 15 in any suitable manner.

The material such as grain kept in the container 13 is by its own weight urged downwardly towards the drum 1' and when this rotates the two strip elements 5', 6' rip and carry along the material and introduce it into the interior of the drum through the slots 3', 4' and from the interior of the drum it is further conveyed in a regular stream by the helical interior flanges to the outlet opening 8' where the air stream passing by catches the material and sends it on through the duct while simultaneously drying the same.

Figure 4:
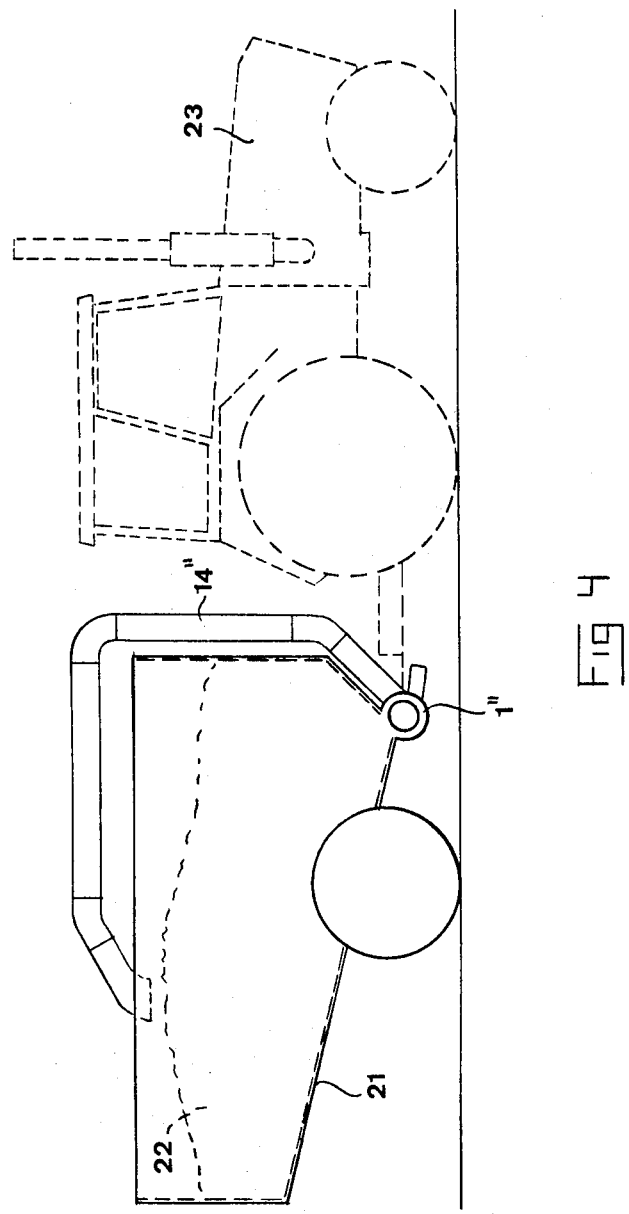

In practice, the feeding device according to the invention may with particular advantage be used in connection with the drying of newly-threshed grain. In one embodiment this is illustrated in FIG. 4 which shows how a tractor-drawn container vehicle 21 at the bottom thereof has a feeding device 1" according to the invention. In the vehicle or the container newly treshed grain 22 is kept, said grain being about to be transported a certain distance to the silo in which long-range storage will take place. The feeding device 1" is connected to a conveying duct 14" which opens at the top portion of the container. Through any suitable heat exchanger (not shown) the feeding device 1" may be connected to the exhaust system of the tractor 23 so that pre-heated air can be introduced into the feeding device and/or the conveying duct 14". Furthermore the feeding device may be connected to a suitable fan device, the feeding device as well as the fan being driven from the power takeoff of the tractor. The grain 22 taken in into the feeding device and passed on through the duct 14" will describe a continuous circulation through the container, the feeding device and the duct while successively drying the material, the heating of the air being very helpful of increasing the drying effect.

Figure 5:
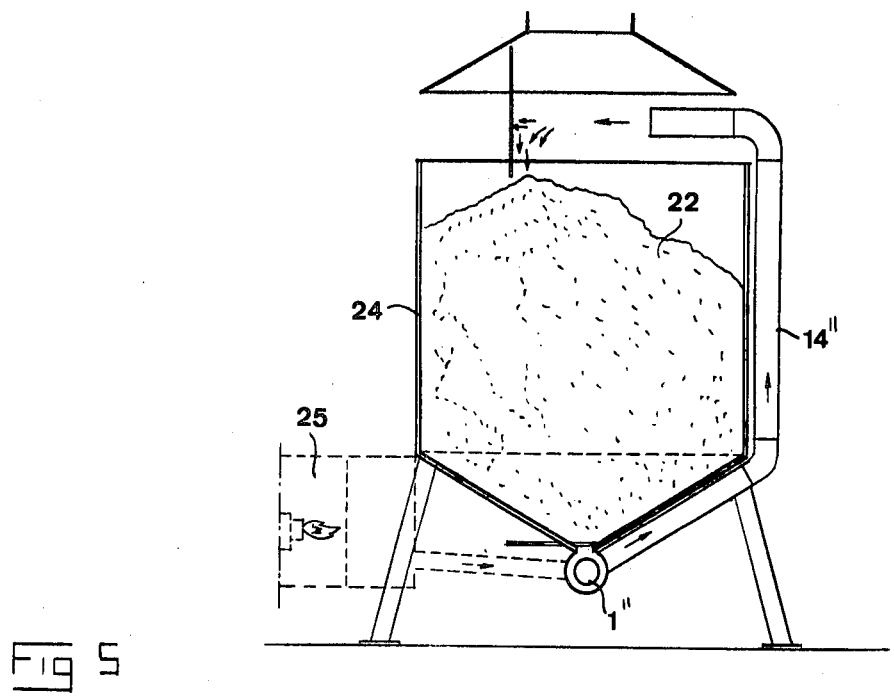

In FIG. 5 a stationary silo container 24 is illustrated the conical bottom portion of which has a feeding device 1" which—as in the preceding case—co-operates with a conveying duct 14" which opens at the top portion of the container. In this case the feeding device also co-operates with a stationary source of heat 25 for preheating the air to the conveying duct.

Figure 6:
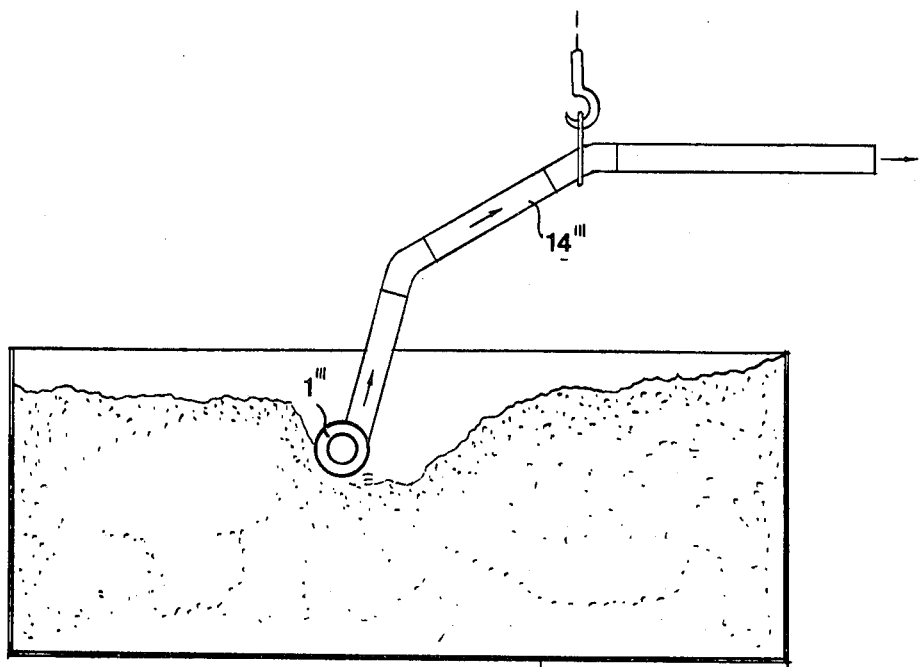

Finally FIG. 6 illustrates a movable feeding device 1''' connected to a movable conveying duct 14'''. By the fact that the feeding device is movable it can be used in order to pick up bulk material anywhere in a container 26 and pass on the material to the desired location. In practice the container 26 may be the hold of a ship or a vehicle and the material may for instance consist of chips or chemicals, such as sulphate.

Of course the invention is not limited merely to the embodiments described above and shown in the drawings. Thus for instance it is possible to connect two or more feeding devices to one and the same conveying duct, e.g. by arranging the devices at opposite sides of the duct and let the same be driven by a common motor or driving means. Further it is conceivable to make the drum of the feeding device open at both ends. Then it is possible to introduce pre-heated air in any arbitrary manner into the open end being opposed to the outlet opening 8.

I claim:

1. A feeding device comprising a rotary drum in the casing wall of which one or more openings are provided to serve as intakes, with which blade-like elements cooperate, said blade elements projecting outwardly from the outside of the casing wall so as to rip and carry along goods and bring it into the interior of the drum through said intake upon rotation of the drum, means being provided inside the casing wall for conveying the goods introduced into the drum to an outlet opening at an end of the drum, said intake openings being in the form of narrow slots, which together with the associated blade elements extend helically along the casing wall, said means for conveying the goods to the outlet opening including a flange which projects from the inside of the casing wall towards the interior of the drum, said flange extending, like the slots and the blade elements, helically in the direction from one of the ends of the drum towards the other, the pitch of the slots and the blade elements along the drum being greater than the pitch of the interior flange.

2. A feeding device according to claim 1, wherein the blade like element is in the form of a strip the width of which does not substantially exceed the width of the slot.

3. A feeding device according to claim 1 wherein the slot and the blade element extend continuously from one end of the drum to the other.

4. A feeding device according to claim 1 wherein the helix of the interior flange is opposite to the helix of the exterior blade element.

5. A feeding device according to claim 1 wherein the drum at the outlet opening thereof opens into a conveying duct in which an air stream is provided in order to convey goods which has been fed out of the drum to the location intended.

6. A feeding device according to claim 1 wherein the drum is mounted in the bottom portion of a container in which the goods is contained.

7. A feeding device according to claim 1, wherein the slot(s) and the blade element(s) extend all around the drum as viewed in the axial direction thereof.

* * * * *